US011369868B2

(12) United States Patent
Warne

(10) Patent No.: US 11,369,868 B2
(45) Date of Patent: Jun. 28, 2022

(54) MOTION GENERATOR

(71) Applicant: DYNISMA LTD., Bristol (GB)

(72) Inventor: Ashley William Hawker Warne, Bristol (GB)

(73) Assignee: DYNISMA LTD., Bristol (GB)

( * ) Notice: Subject to any disclaimer, the term of this patent is extended or adjusted under 35 U.S.C. 154(b) by 0 days.

(21) Appl. No.: 17/256,415

(22) PCT Filed: Jul. 8, 2019

(86) PCT No.: PCT/EP2019/025218
§ 371 (c)(1),
(2) Date: Dec. 28, 2020

(87) PCT Pub. No.: WO2020/007507
PCT Pub. Date: Jan. 9, 2020

(65) Prior Publication Data
US 2021/0268369 A1 Sep. 2, 2021

(30) Foreign Application Priority Data
Jul. 6, 2018 (GB) .................................. 1811182

(51) Int. Cl.
*A63F 13/28* (2014.01)
*G06F 3/00* (2006.01)
(Continued)

(52) U.S. Cl.
CPC .............. *A63F 13/24* (2014.09); *A63F 13/28* (2014.09); *G09B 9/12* (2013.01); *B25J 9/0078* (2013.01); *G06F 3/011* (2013.01)

(58) Field of Classification Search
CPC .. A63F 13/28; G09B 9/12; G06F 3/011; B25J 9/0078; A63G 31/14
See application file for complete search history.

(56) References Cited

U.S. PATENT DOCUMENTS

| 4,666,362 | A | 5/1987 | Landsberger et al. |
| 7,172,385 | B2 * | 2/2007 | Khajepour ........... B25J 17/0266 414/735 |

(Continued)

FOREIGN PATENT DOCUMENTS

| EP | 1063064 A2 | 12/2000 |
| GB | 2378687 A | 2/2003 |

(Continued)

OTHER PUBLICATIONS

International Searching Authority, International Search Report and Written Opinion for International Application No. PCT/EP2019/025216, dated Sep. 30, 2019, (11 pages), European Patent Office, Rijswijk, Netherlands.

(Continued)

*Primary Examiner* — Steven J Hylinski
(74) *Attorney, Agent, or Firm* — Alston & Bird LLP

(57) ABSTRACT

This invention relates to motion generators comprising: an end effector, a stationary support, a first set of elastic elements interconnecting the end effector and the stationary support; a set of tensile members; in which the end effector is supported within the stationary support by the elastic elements; and a set of actuators in which the motion generator further comprises at least six rockers each rocker being pivotally mounted at one end thereof on the stationary support, and each rocker having a free end; the set of tensile members comprising: at least six elongate tensile members, each elongate tensile member having one end connected to a rocker and the other end connected to one of a second set of elastic elements which are fixed; a set of connecting elements connecting each rocker to the end effector and in which each one of the set of tensile members is independently adjustably tensioned by an associated actuator to move the free end of the rocker, which rocker movement (Continued)

causes movement of a connected connecting element leading to movement of the end effector.

20 Claims, 10 Drawing Sheets

(51) Int. Cl.
*A63F 13/24* (2014.01)
*G09B 9/12* (2006.01)
*G06F 3/01* (2006.01)
*B25J 9/00* (2006.01)

(56) References Cited

U.S. PATENT DOCUMENTS

| | | | |
|---|---|---|---|
| 7,753,642 | B2 | 7/2010 | Bosscher et al. |
| 9,091,391 | B2 * | 7/2015 | Thieme-Marti ...... F16M 11/043 |
| 9,801,775 | B2 | 10/2017 | Vallery et al. |
| 10,262,549 | B2 * | 4/2019 | Warne .................. G09B 19/167 |
| 10,413,836 | B2 * | 9/2019 | Blum ...................... A63G 7/00 |
| 2007/0171199 | A1 | 7/2007 | Gosselin |
| 2012/0080578 | A1 | 4/2012 | Thieme-Marti |
| 2012/0301853 | A1 | 11/2012 | Garvis et al. |
| 2016/0140862 | A1 | 5/2016 | Van Lookeren Campagne et al. |
| 2016/0236100 | A1 | 8/2016 | Douglas et al. |
| 2017/0053548 | A1 | 2/2017 | Warne |
| 2021/0158719 | A1 | 5/2021 | Warne |

FOREIGN PATENT DOCUMENTS

| | | |
|---|---|---|
| GB | 2464814 A | 5/2010 |
| WO | WO-2017/037458 A1 | 3/2017 |
| WO | WO-2018/055387 A1 | 3/2018 |

OTHER PUBLICATIONS

International Searching Authority, International Search Report and Written Opinion for International Application No. PCT/EP2019/025218, dated Oct. 9, 2019, (10 pages), European Patent Office, Rijswijk, Netherlands.

* cited by examiner

MOTION GENERATOR

CROSS REFERENCE TO RELATED APPLICATIONS

This application is a National Stage Application, filed under 35 U.S.C. § 371, of International Application No. PCT/EP2019/025218, filed Jul. 8, 2019, which international application claims priority to and the benefit of Great Britain Application No. 1811182.3, filed Jul. 6, 2018; the contents of both of which as are hereby incorporated by reference in their entireties.

BACKGROUND

Related Field

This invention relates to a motion generator i.e. a form of robotic system. More particularly, the invention relates to a motion generator having a moveable end effector, for use, for example, in motion systems such as motion platforms. and to methods of using motion generators and motion systems.

Description of Related Art

Motion generators are used in a variety of applications, including motion simulation (for example, flight simulators, driving simulators), robotics, 3D printing, vibration and seismic simulation. An early type of motion generator is disclosed in GB1160471. The most common type of motion generator currently used in motion simulation is the Stewart platform (or "hexapod"). US2016/0140862 discloses such a hexapod. This is a type of parallel robot that has six actuators, attached in pairs to three configurations on the baseplate of a platform and crossing over to three mounting points on a top plate. Devices or payloads such as a human user placed on the top plate, usually in some form of cockpit, driver area or model vehicle, can be moved in the six degrees of freedom in which it is possible for a freely-suspended body to move, i.e. the three linear movements x, y, z (lateral, longitudinal and vertical), and the three rotations (pitch, roll and yaw). Alternatively, the payload may also be a further motion generator which is said to be in series with the first.

A motion simulator is a mechanism that can create, for an occupant, the effects or feelings of being in a moving vehicle and includes a motion system i.e. at least one motion generator and an associated control system. Motion simulators are used, professionally, for training drivers and pilots in the form of driving simulators and flight simulators respectively. They also are used, industrially, in the creation, design, and testing of the vehicles themselves.

Professional motion simulators used as driving and flying simulators typically synchronise a visual display—provided for example by a projection system and associated screens and audio signals with the movement of a carriage (or chassis) occupied by the driver or pilot in order to provide a better sensation of the effect of moving. The advent of virtual reality (VR) head-mounted displays (HMDs) makes the aspect of an immersive simulation less costly with current motion systems and has the ability to deliver virtual reality applications to leisure uses such as in passive amusement park or arcade driving, riding-first-person, or flying rides and in active gaming, where one or more players has some control over the driving, riding, flying or first-person game experience.

The type of hexapods typically used in motion simulation for human participants typically have a bandwidth of up to about 20 Hz. This means that they can create oscillatory movements and vibrations of a consistent amplitude, with a frequency of up to 20 times per second, beyond which the amplitude of the movements reduces as the frequency increases. This is sufficient for most car suspension movements, but it does not transmit the frequency content associated with vibrations from the car engine, tyre vibrations, road noise and the sharp-edged kerbs on race tracks. A low bandwidth also means the signals are delayed, meaning the driver cannot respond as quickly.

Current motion generators, especially those intended for high-end use such as in military and commercial flight instruction and training applications, are typically very large, heavy, complex and expensive. Their complexity necessitates extensive programming and maintenance, further extending the cost. An example of a motion generator in a flight simulator is disclosed in US2012/301853. Dedicated driving simulator motion systems have been developed by the likes of McLaren/MTS Williams/ABD and Ansible, but these tend to be extremely mechanically complex, and therefore expensive, featuring precision machined custom components and often expensive linear motors. These dedicated driving simulator motion systems are more responsive than hexapods when moving in some directions but are still limited in others. The use of ballscrews in systems is disadvantageous in that whilst good at establishing position they inhibit force transfer, and can only achieve a lower bandwidth, and so result in a less natural experience for a human user.

EP1063064 discloses a six degree of freedom travelling system including a cage for a human user(s). The cage's configuration is maintained by eight cables or wires. The system requires a pair of overhead suspension cables and an overhead connection which is disadvantageous in several respects. First, it requires an overhead attachment limiting the location of the system. Second, the overhead suspension cables increase the overall dimensions of the system and make it unsuitable when a compact installation is required.

US2012/0080578 discloses a six degrees of motion platform including a platform supported on a suspension unit which is mounted on a base. The platform, which is particularly designed for planning radiation treatment by simulating movement of a patient to be treated in relation to a radiation therapy device, is moved on the suspension unit by six actuator-controlled non-magnetic/non-metallic strings.

WO2017/037458 discloses a limited movement cable/actuator-controlled motion platform system including a carriage which is capable of movement in the horizontal plane only. The motion platform system relies on a secondary ram-operated motion system for vertical movement. The system is quite limited in its application.

U.S. Pat. No. 4,666,362 discloses a three to six degree of freedom cable/actuator-controlled motion generator including a moving platform (end effector) supported on a base platform by an extensible or telescoping central post. In this system the motors must be constantly energised to keep the cables in tension and the end effector in position. This requires large motors or a gearbox to generate the continuous torque, which limits the bandwidth of the system.

US2017/0053548 discloses a motion generator including a cable/actuator-controlled platform which is slidable on a large low friction fixed base and which allows for significant horizontal movement of the platform. The cables and actuators are disposed around the periphery of the large base, facilitating the significant horizontal movement of the platform. A hexapod is in turn mounted on the platform and supports a model cockpit in order to provide further movement. The system is not compact and requires control of both the cable/actuator-controlled platform as well as of the hexapod.

GB2378687A discloses a motion generator having a platform mounted on motion units which move on parallel rails driven by linear motors. The arrangement is somewhat complex, and expensive to produce.

It is an object of the present invention to provide a system which may be capable of motion in the six degrees of freedom, which may be haptic and may be capable of human input but which, compared to existing systems, may be mechanically simpler, may be cheaper to build, which may have high backdrivability, which may be controlled at higher frequencies than anything in a comparable price bracket and/or which may be manufactured to accompany a virtual reality headset.

BRIEF SUMMARY

According to one aspect of the invention there is provided a motion generator having a moveable end effector, which may, for example be, a platform, vehicle chassis or replica thereof and may or may not support a user, the motion generator comprising: an end effector, a stationary support, a first set of elastic elements interconnecting the end effector and the stationary support; a set of tensile members; in which the end effector is supported within the stationary support by the elastic elements; and a set of actuators in which the motion generator further comprises at least six rockers each rocker being pivotally mounted at one end thereof on the stationary support, and each rocker having a free end; the set of tensile members comprising: at least six elongate tensile members, each elongate tensile member having one end connected to a rocker and the other connected to one of a second set of elastic elements which are fixed; a set of connecting elements connecting each rocker to the end effector, and in which each one of the set of tensile members is independently adjustably tensioned by an associated actuator to move the free end of the rocker, which rocker movement causes movement of a connected connecting element leading to movement of the end effector.

Typically, the motion generator of the invention is arranged on a surface whereby the end effector is moved in relation to the surface. The surface may be for example a floor in a building where the motion generator is located The motion generator of the invention may be used in a variety of applications, including motion simulation (for example, flight simulators, driving simulators), robotics, 3D printing, vibration and seismic simulation.

A motion generator in accordance with the invention can be constructed of relatively light weight components. It may be stiff, and its motion is relatively frictionless compared to Stewart platforms and so may be controlled to produce accelerations, motions, forces or moments, of high frequencies, in six degrees of freedom up to and in excess of 50 Hz and more advantageously 100 Hz. Such high frequency (or "bandwidth"), which permits, for example, much more realistic simulation of vehicle behaviour in different scenarios such as racetrack, emulating racetrack features such as sawtooth kerbs, off-road and battlegrounds has not been possible with prior art 6 degrees of freedom motion generators of similar or indeed much greater cost. The motion generator of the invention may be backdrivable which is highly advantageous. Furthermore, the system of the invention may be produced in a commercial format which is much more compact compared to many prior art designs, and additionally, does not require overhead suspension devices which limit installation options. Furthermore, a motion generator in accordance with the invention may be readily installed in a typical building without onerous structural building requirements, or the need for a special flat surface.

The actuators may comprise rotary electric motors. Other motors are contemplated including rotary and guided linear variants of electric, hydraulic and pneumatic motors.

The second set of elastic elements may be fixed to the stationary support.

The actuators may be mounted on the stationary support but could be mounted elsewhere.

The rockers may be arranged for movement in a plane parallel with the end effector when in a neutral condition or configuration. The plane may be parallel with the surface.

At least one of the rockers may move in a horizontal plane. Preferably all of the rockers may move in a horizontal plane.

The tensile members may include an actuator-engaging surface. For example, the actuator-engaging surface may be provided by a toothed belt or chain acting on a sprocket, or by the use of a high friction coating. Alternatively, the tensile member may wrap once or more times around a drum to increase adhesion between the tensile member and actuator.

The actuators may be independently controlled to vary the position of the rockers independently. For example, the actuators may be controlled by programmable control means.

The connecting elements may be resilient members. For example, the connecting elements may be wire rope; high modulus polyethylene (HMPE) rope; carbon fibre tethers; rigid rods with joints, rod ends, flexible straps or flexures at each end; fabric straps; Kevlar; PBO (or "Zylon"); or Dyneema.

In a preferred embodiment the motion generator is backdrivable that is to say the motion generator applies little resistance to external forces being applied to it—for example when a user supported by the end effector moves their weight around—then the forces applied by the user causes the actuator motors to rotate. By measuring the movement of the motors in response to the user's movement, the user's position and movements can be inferred. The outputs relating to the user's position and/or movements can be used to inform for example a control system, a visual display system, and/or audio system.

According to another aspect of the invention there is provided a motion system, the motion system comprising a motion generator in accordance with the invention and a control system. The control system may comprise the programmable control means mentioned above. The control system may be integrated with or remote from the motion generator.

According to a further aspect of the invention, there is provided a combination comprising a motion generator, or a motion system according to the preceding claim, and another motion generator. Such a combination may provide alternative movement possibilities.

According to another aspect of the invention there is provided a vehicle or driving simulator including a motion generator or motion system according to the invention and comprising at least one vehicle control means, such as a steering wheel, gear change, or control pedal and an environment simulator such as means for projecting a vehicle environment such as a racetrack, road, off-road scenario or battleground. The environment simulator may include a virtual reality headset or projection system.

Motion generators and motion systems of the invention are useful in automotive and automotive component testing and design. According to another aspect of the invention there is provided method of vehicle or vehicle component design, the method comprising the steps of first providing a motion generator according to the invention, or a motion system according to the invention, or a combination according to the invention, or a vehicle simulator according to the invention, then simulating a vehicle or component design feature or change and testing the effect of that feature using the motion generator, motion system, combination or vehicle simulator. The output of the testing is test data.

According to another aspect of the invention there is provided game apparatus including a motion generator, motion system or combination according to the invention. The game apparatus may be located within an amusement arcade for example, but equally may be for domestic or commercial use. The game apparatus may include means for simulating an environment. The means for simulating an environment may include display apparatus, virtual reality apparatus, or projection apparatus.

According to another aspect of the invention there is provided a method of producing a motion generator, motion system, combination, vehicle simulator according to the invention.

BRIEF DESCRIPTION OF THE FIGURES

Motion generators, motion systems, and driving simulators and their operation, uses and production in accordance with the invention will now be described, by way of example only, with reference to the accompanying drawings, FIGS. 1 to 10, in which.

DETAILED DESCRIPTION OF VARIOUS EMBODIMENTS

A Motion Generator

Figure 1:
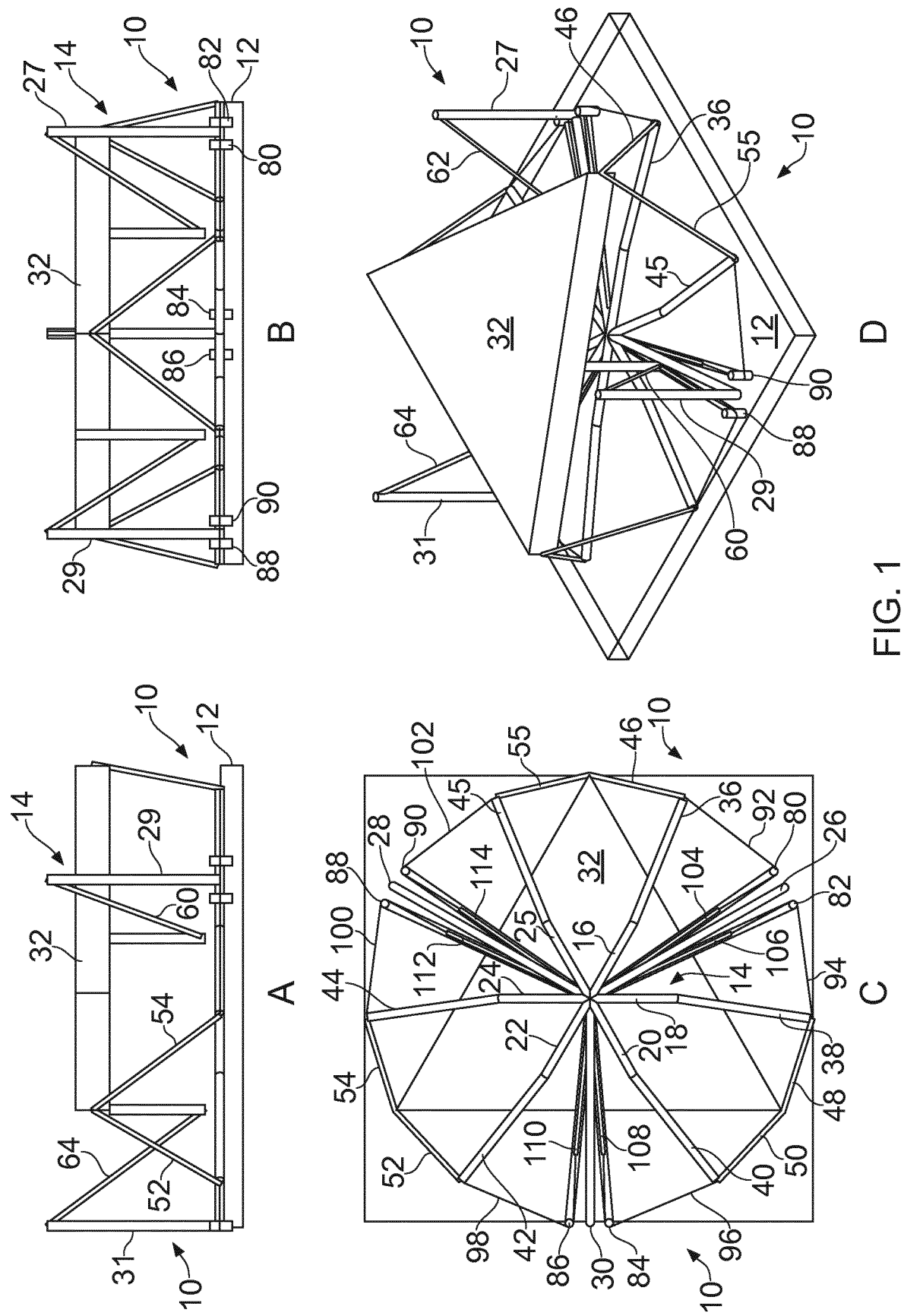
FIG. 1A is an elevation from one side of a motion generator in accordance with the invention in a neutral configuration.
FIG. 1B is an elevation from the front of the motion generator as shown in FIG. 1A.
FIG. 1C is a simplified plan view from below of the motion generator as shown in FIG. 1A.
FIG. 1D is a perspective view of the motion generator as shown in FIG. 1A from above, front and one side.
Figure 2:
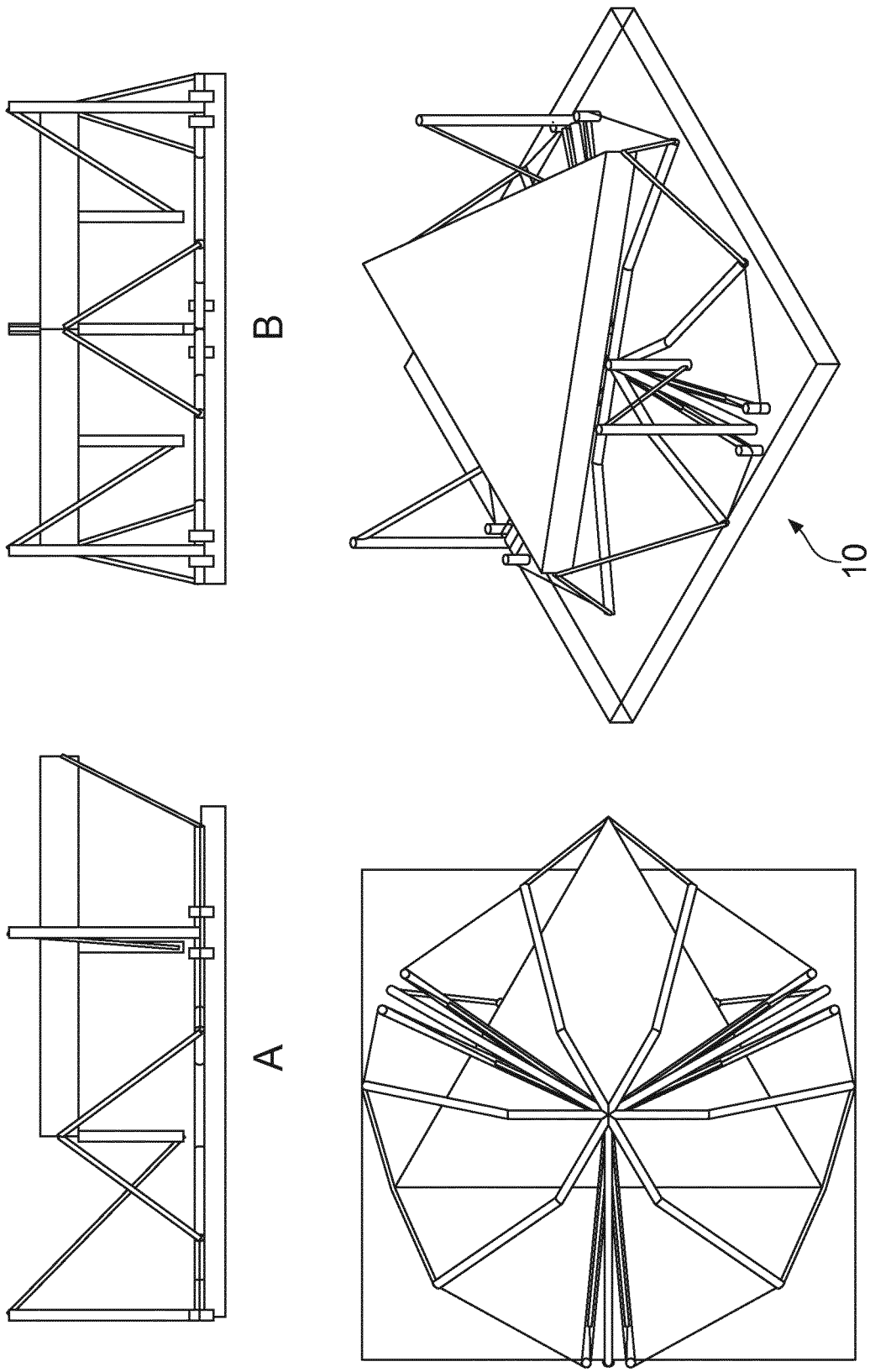
FIG. 2A is an elevation from one side of the motion generator of FIG. 1 when in a surge forward along the x-axis configuration.
FIG. 2B is an elevation from the front of the motion generator as shown in FIG. 2A.
FIG. 2C is a simplified plan view from below of the motion generator as shown in FIG. 2A.
FIG. 2D is a perspective view of the motion generator as shown in FIG. 2A.
Figure 3:
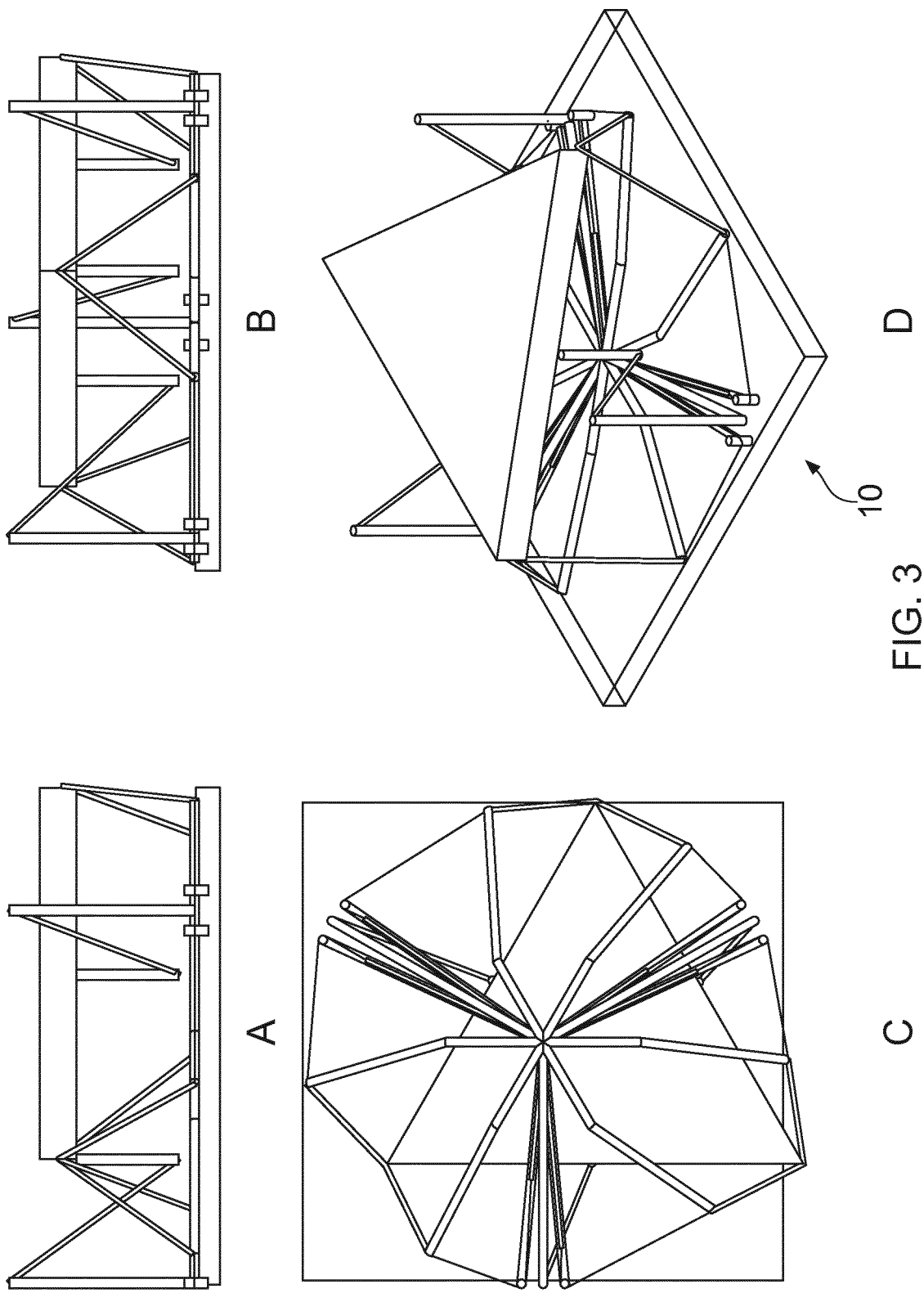
FIG. 3A is an elevation from one side of the motion generator of FIG. 1 when in a sway laterally along the y-axis configuration.
FIG. 3B is an elevation from the front of the motion generator as shown in FIG. 2A.
FIG. 3C is a simplified plan view from below of the motion generator as shown FIG. 2A.
FIG. 3D is a perspective view of the motion generator as shown in FIG. 2A.
Figure 4:
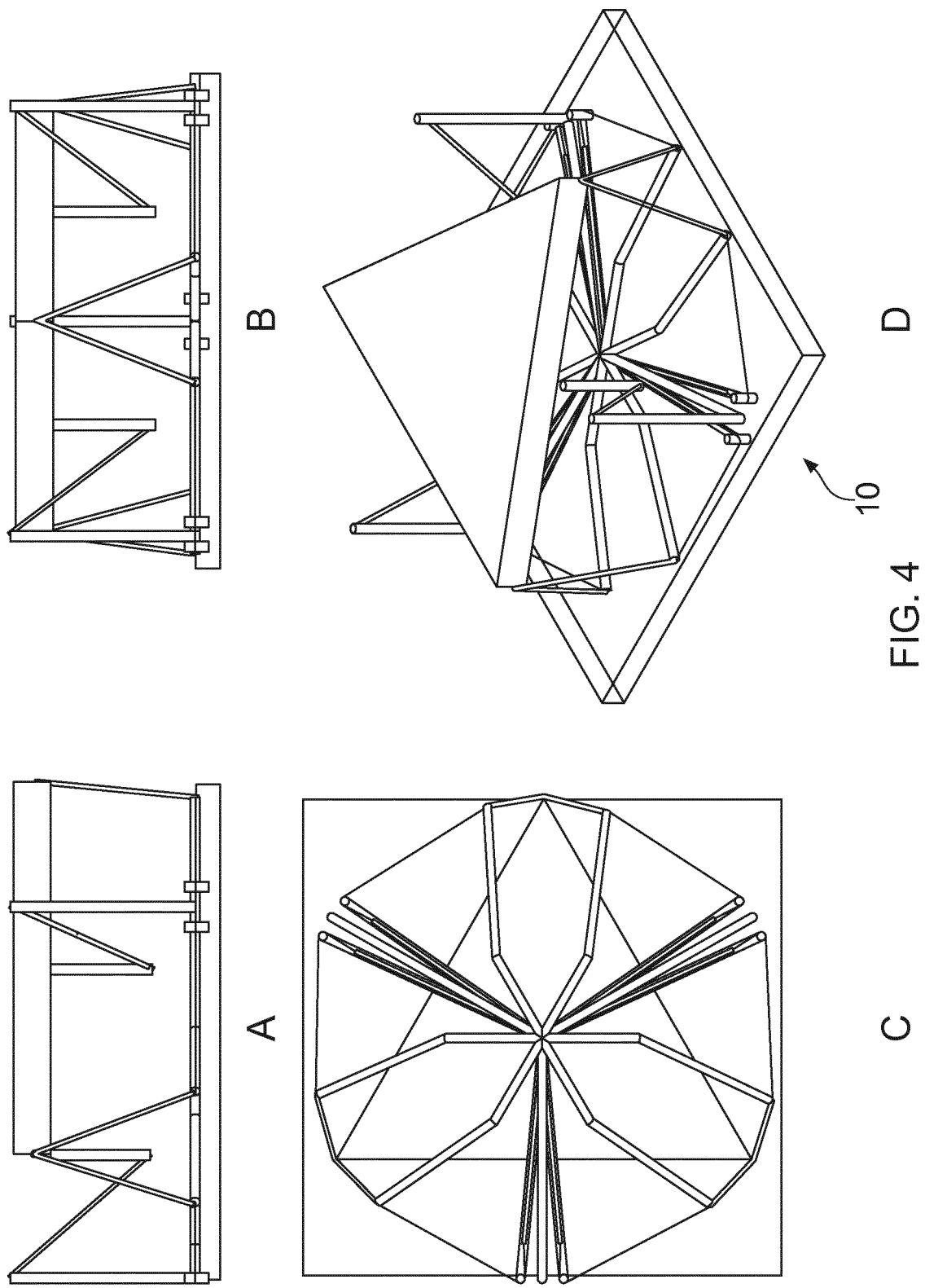
FIG. 4A is an elevation from one side of the motion generator of FIG. 1 when in a heave vertically along the z-axis configuration.
FIG. 4B is an elevation from the front of the motion generator as shown in FIG. 4A.
FIG. 4C is a simplified plan view from below of the motion generator as shown in FIG. 4A.
FIG. 4D is a schematic perspective view of a motion generator as shown in FIG. 4A.
Figure 5:
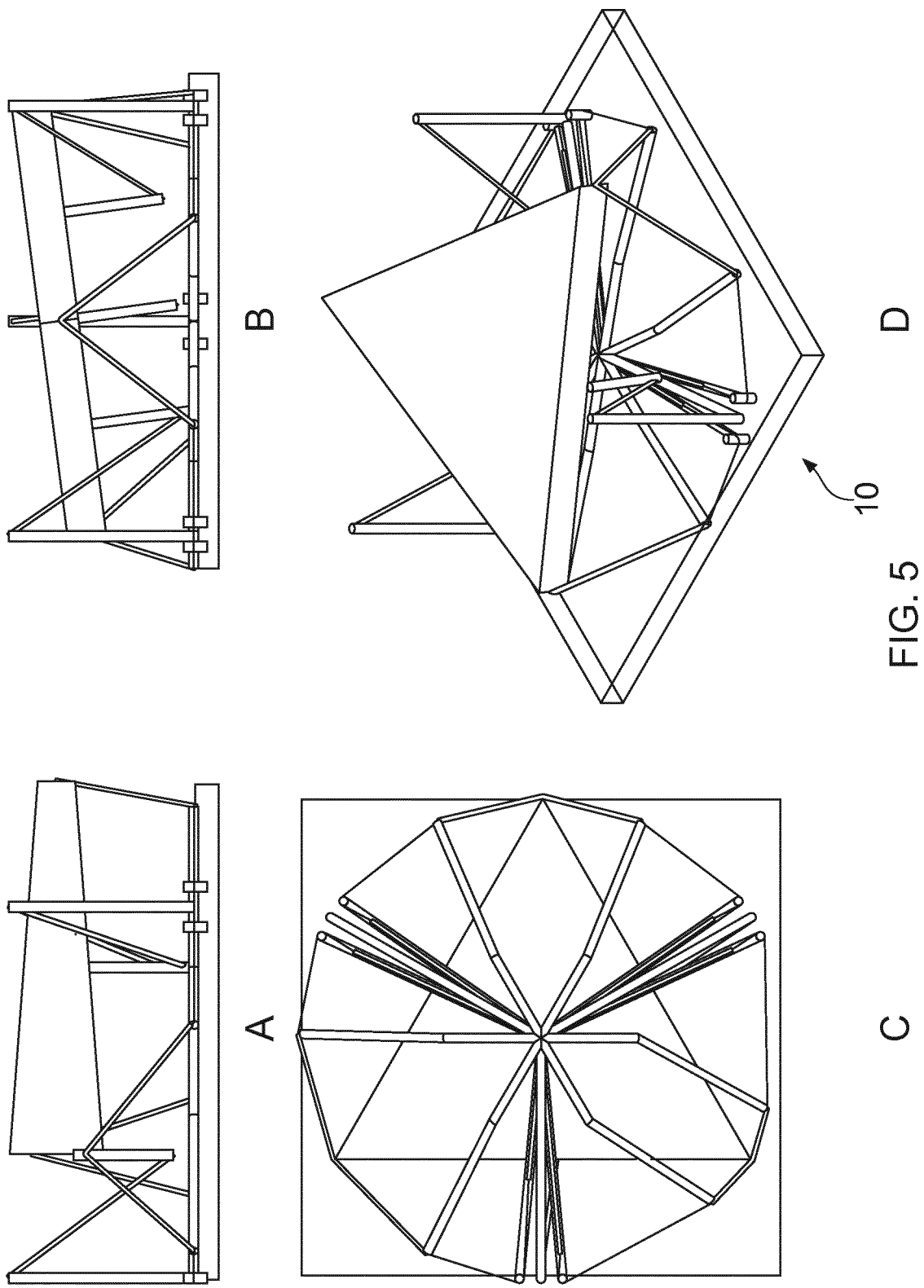
FIG. 5A is an elevation from one side of the motion generator of FIG. 1 when in a roll about the x-axis configuration.
FIG. 5B is an elevation from the front of the motion generator as shown in FIG. 5A.
FIG. 5C is a simplified plan view from below of the motion generator as shown in FIG. 5A.
FIG. 5D is a schematic perspective view of a motion generator as shown in FIG. 5A.
Figure 6:
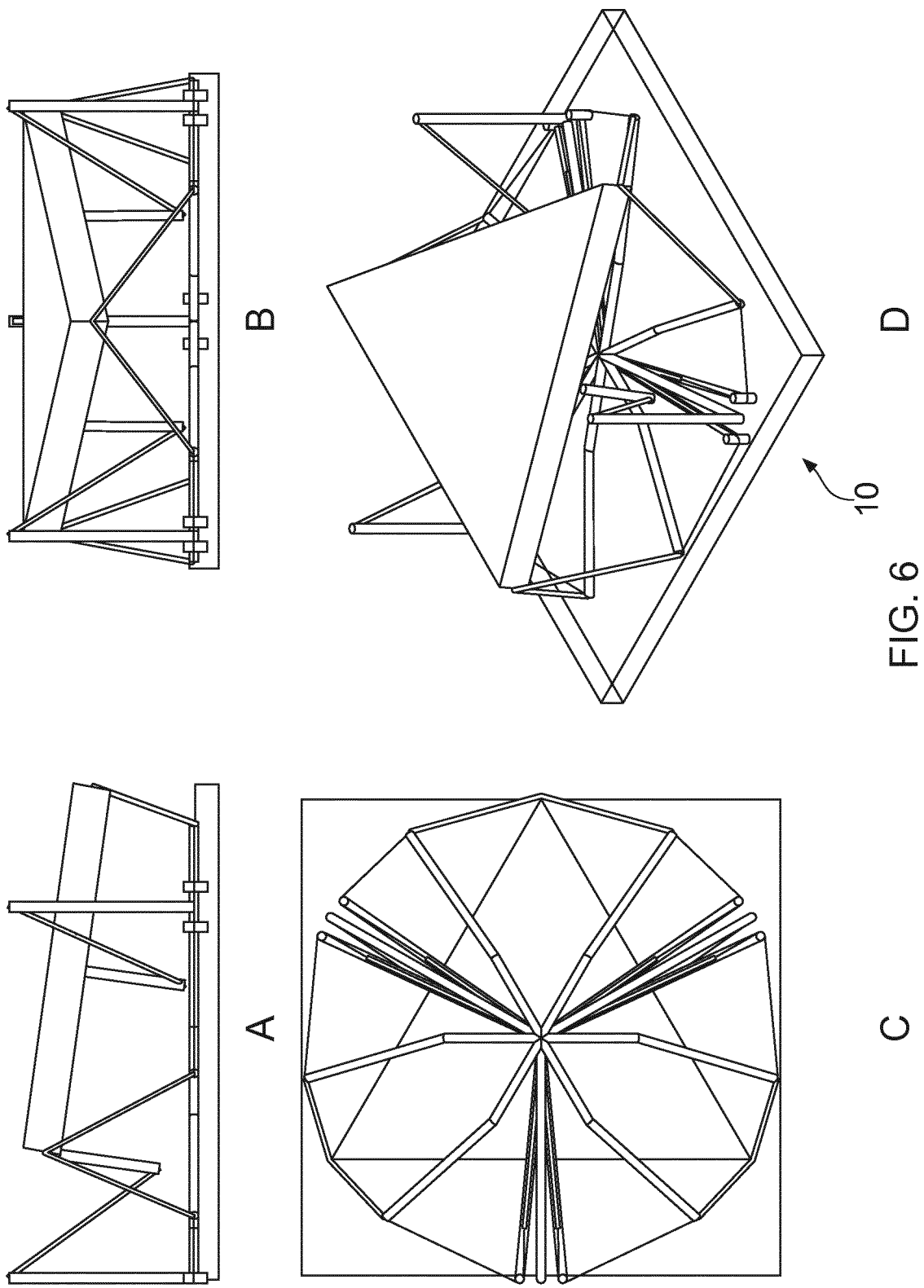
FIG. 6A is an elevation from one side of the motion generator of FIG. 1 when in a pitch about the y-axis configuration.
FIG. 6B is an elevation from the front of the motion generator as shown in FIG. 6A.
FIG. 6C is a simplified plan view from below of the motion generator as shown in FIG. 6A.
FIG. 6D is a schematic perspective view of a motion generator as shown in FIG. 6A.
Figure 7:
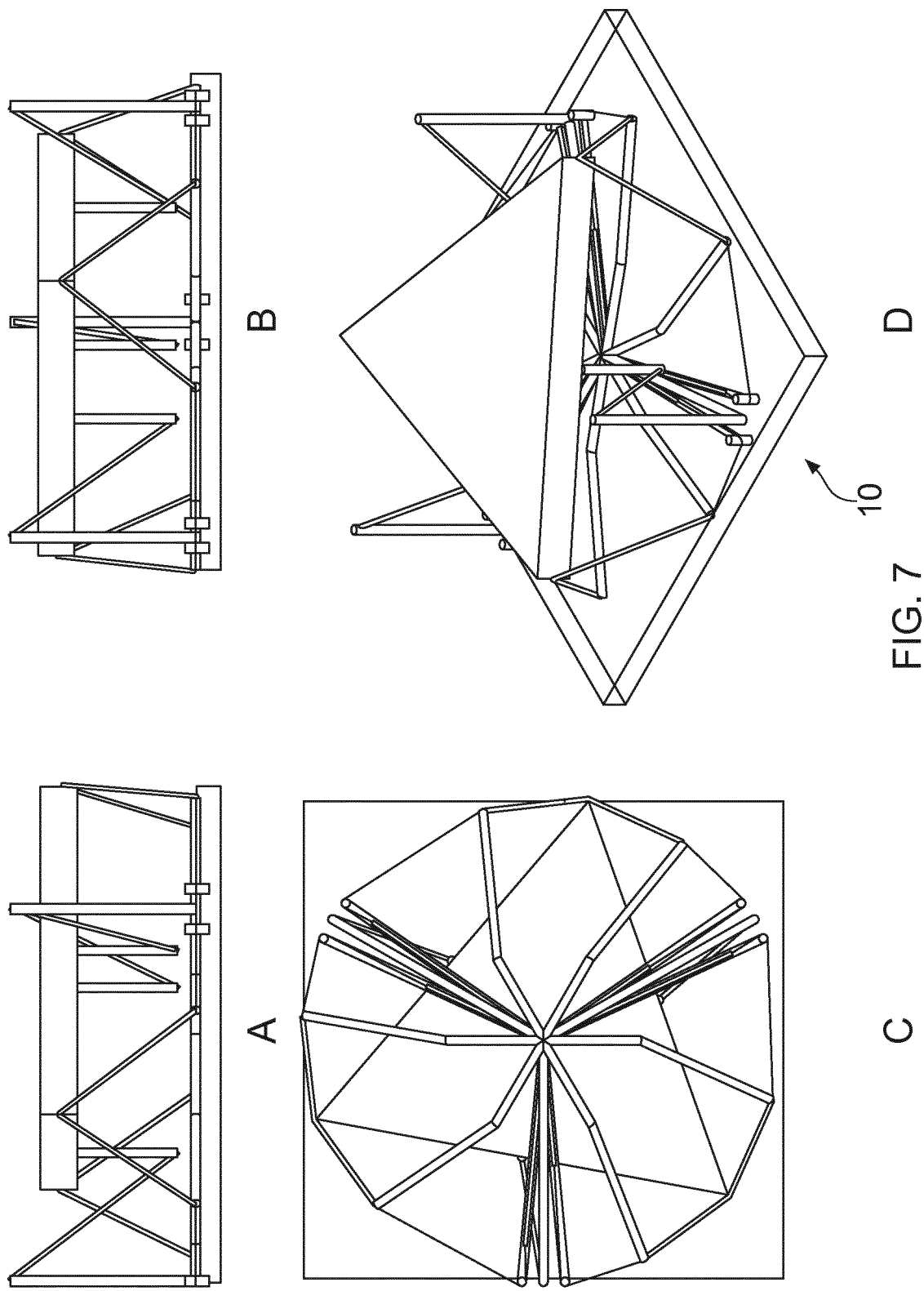
FIG. 7A is an elevation from one side of the motion generator of FIG. 7 when in a yaw about the z-axis configuration.
FIG. 7B is an elevation from the front of the motion generator as shown in FIG. 7A.
FIG. 7C is a simplified plan view from below of the motion generator as shown in FIG. 7A.
FIG. 7D is a schematic perspective view of a motion generator as shown in FIG. 7A.
Figure 8:
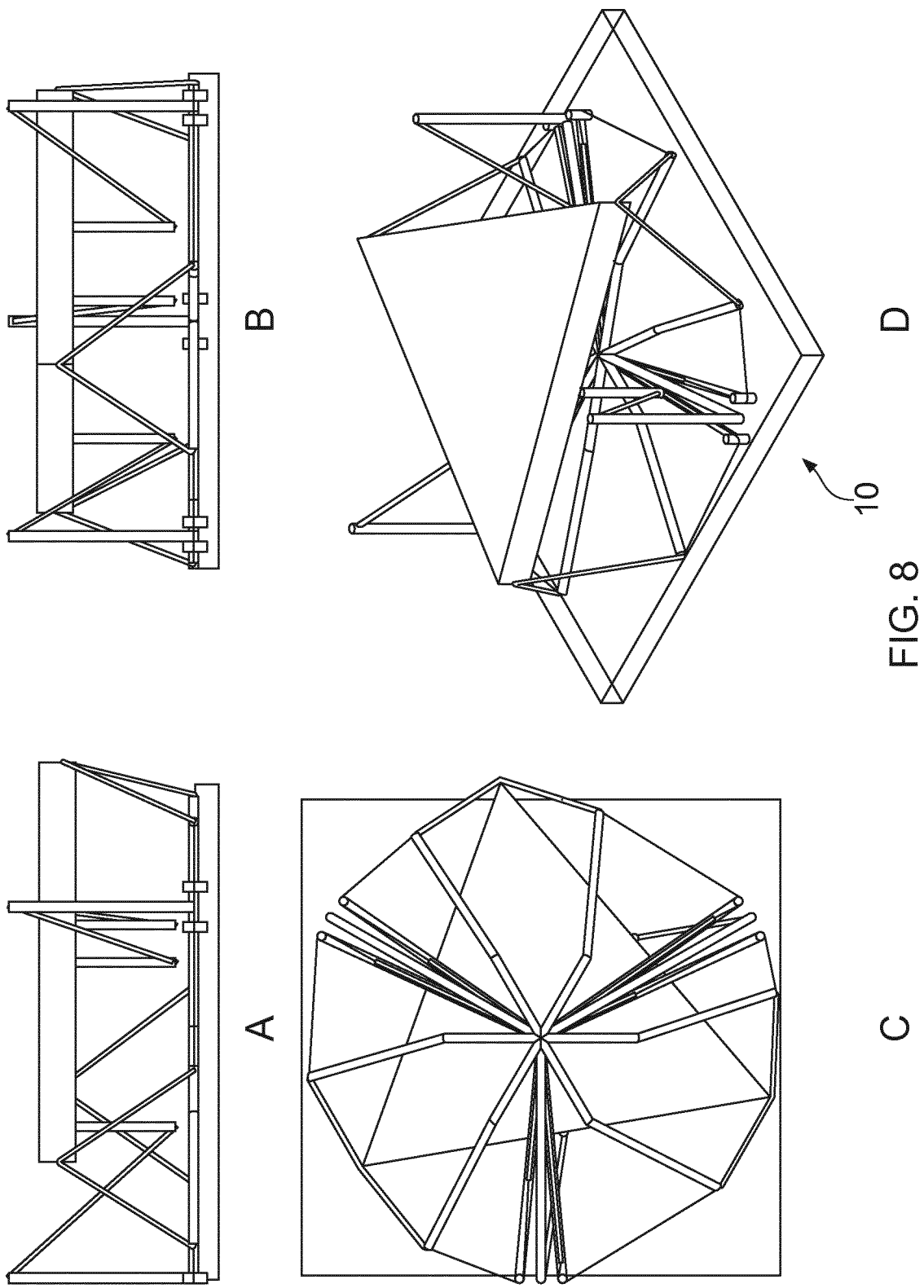
FIG. 8A is an elevation from one side of the motion generator of FIG. 1 when in a combined surge, sway and yaw configuration
FIG. 8B is an elevation from the front of the motion generator as shown in FIG. 8A.
FIG. 8C is a simplified plan view from below of the motion generator as shown in FIG. 8A.
FIG. 8D is a schematic perspective view of a motion generator as shown in FIG. 8A.

A motion generator 10 in accordance with the invention is shown in FIGS. 1 to 9. The motion generator 10 is mounted on a surface such as floor 12. The floor 12 may be that of a test building in which the motion generator is located or may be an additional floor unit which overlays another floor in use.

The motion generator 10 comprises a rigid frame 14, of tubular space-frame type construction including lower elongate tubular elements 16, 18, 20, 22, 24, and 25, and longer tubular elements 26, 28, and 30, which each have a lower horizontal portion co-planar with tubular elements 16, 18, 20, 22, 24 and 25 to form the base of the frame 14 and which each also have an upstanding portion 27, 29, and 31 respectively. Although tubular components have been described, those components may be for example solid. The frame 14 may be made of materials such as steel, or other alloy, aluminium, aluminium alloy, titanium or carbon fibre and in the form of separate components joined rigidly together or could equally be moulded in one or more pieces. Suspended within the volume created by the frame 14 is a platform (or end effector) 32 which is sufficient to carry a significant load, for example a seat and a human user, or a vehicle chassis or monocoque. The platform 32 has a triangular planform. Other planforms are anticipated for the platform.

Six rockers 36, 38, 40, 42, 44, and 45 are pivotally mounted by one end thereof on the ends of tubular elements 16, 18, 20, 22, 24, and 25 for movement in the horizontal plane only. More rockers may be used. In other embodiments the rockers may move in different planes according to the application and configuration. Whilst straight rockers have been shown in this example other shapes are contemplated for the rockers including L-shaped or V-shaped. Elongate struts 46, 48, 50, 52, 54, and 55 are in turn pivotally mounted on the other ends of the rockers 36, 38, 40, 42, 44, and 45 respectively by their lower ends. The opposing end of each strut 46, 48, 50, 52, 54, and 55 is pivotally mounted to the corners of the triangular motion platform 32 in pairs 46, 45; 48, 50; and 52, 54. The struts 46, 48, 50, 52, 54, and 55 could be replaced by tensile members such as ropes, wire ropes or belts. One example of a suitable rope is M-Rig Max made from Dyneema's DM20 by Marlow. A suitable wire rope is SS 1x7/1x19 Compacted made by Certex. A suitable belt is Conti® Synchrochain Carbon made by Continental.

As shown in FIG. 1A, the platform 32 is supported by three elastic cords 60, 62 and 64 which are fixed at one end to the ends of upstanding portions 27, 29 and 31 of the frame 14, and fixed at the other end to rigid elongate members 70, 72 and 74 which are fixed to and depend from the base of the platform 30. An example of a suitable elastic cord would be a Powerspring by Ibex Marina. Three or more elastic elements in the first set of elastic elements are preferred. Too many elastic elements may inhibit operation. Elastic cords 60, 62, 64 could be replaced by helically coiled springs, or wire ropes connected to another elastic energy storage device such as a torsion spring.

Six actuators, in the form of rotary electric motors, driving toothed capstans (one suitable example of which would be an AKM2G Servo Motor by Kollmorgan with a synchronous belt sprocket by Martin) 80 (referred to as "actuator 1" below), 82 ("actuator 2"), 84 ("actuator 3"), 86 ("actuator 4"), 88 ("actuator 5"), and 90 ("actuator 6") are fixed to the base 12 or to the frame so that they are constrained from movement. The actuators drive toothed belts 92, 94, 96, 98, 100, and 102 which connect at one end thereof to the rockers and at the other end to the frame 14 or base 12 via a second set of elastic elements in the form of elastic cords 104, 106, 108, 110, 112, and 114, which are anchored rigidly fixed to the frame 14 or base 12. Elastic cords 104, 106, 108, 110, 112, and 114 could be replaced by helically coiled springs, or wire ropes connected to another elastic energy storage device such as a torsion spring In use, each associated rocker, elastic cord, actuator and belt combination 36 104, 80, 92; 38, 106, 82, and 94; 40, 108, 84, 96; 42, 110, 86, 98; 44, 112, 88, 100; and 45, 114, 90, 102, (each combination being referred to in the description below by the actuator number mentioned above) is controlled by computing means (not shown) acting on the actuator to move the associated belt thus altering the state of the connected rocker and elastic cord which affects the motion/position of the platform 32.

Some basic configurations of the motion generator will now be described with reference to the further figures.

Neutral Configuration

In the neutral configuration illustrated in FIG. 1A-D, the motion platform 32 is horizontal, suspended by the elastic cords 60, 62 and 64 with the rockers and elastic cords in a neutral state.

| Actuator number | Rocker position relative to neutral state | Actuator support spring length relative to neutral state |
|---|---|---|
| 1 | Neutral | Neutral |
| 2 | Neutral | Neutral |
| 3 | Neutral | Neutral |
| 4 | Neutral | Neutral |
| 5 | Neutral | Neutral |
| 6 | Neutral | Neutral |

Surge Forward Along the x-Axis Configuration

In the surge forward configuration shown in FIGS. 2A-D, the platform 32 is moved forward by actuator-controlled movement of the rockers and connected elastic cords into the states set out below.

| Actuator number | Rocker position relative to neutral state | Actuator support spring length relative to neutral state |
|---|---|---|
| 1 | Anticlockwise | Extended |
| 2 | Anticlockwise | Contracted |
| 3 | Anticlockwise | Extended |
| 4 | Clockwise | Extended |
| 5 | Clockwise | Contracted |
| 6 | Clockwise | Extended |

Sway Laterally Along the y-Axis Configuration

In the sway sideways configuration shown in FIGS. 3A-D, which may simulate sideways movement of a vehicle, the platform 32 is moved sideways by actuator-controlled movement of the rockers and connected elastic cords into the states set out below.

| Actuator number | Rocker position relative to neutral state | Actuator support spring length relative to neutral state |
|---|---|---|
| 1 | Clockwise | Contracted |
| 2 | Anticlockwise | Contracted |
| 3 | Anticlockwise | Extended |
| 4 | Anticlockwise | Contracted |
| 5 | Anticlockwise | Extended |
| 6 | Clockwise | Extended |

Heave Vertically Along the z Axis Configuration

In the heave upwards configuration shown in FIGS. 4A-D, the platform 32 is moved upwardly by actuator-controlled movement of the rockers and connected elastic cords into the states set out below.

| Actuator number | Rocker position relative to neutral state | Actuator support spring length relative to neutral state |
|---|---|---|
| 1 | Anticlockwise | Extended |
| 2 | Clockwise | Extended |
| 3 | Anticlockwise | Extended |
| 4 | Clockwise | Extended |
| 5 | Anticlockwise | Extended |
| 6 | Clockwise | Extended |

Roll about the x-Axis Configuration

In the roll configuration shown in FIG. 5A-D, the platform 32 rotates about its longitudinal axis by actuator-controlled movement of the rockers and connected elastic cords into the states set out below.

| Actuator number | Rocker position relative to neutral state | Actuator support spring length relative to neutral state |
|---|---|---|
| 1 | Unchanged | Unchanged |
| 2 | Clockwise | Extended |
| 3 | Anticlockwise | Extended |
| 4 | Anticlockwise | Contracted |
| 5 | Clockwise | Contracted |
| 6 | Unchanged | Unchanged |

Pitch about the y Axis Configuration

In the pitch configuration shown in FIG. 6A-D, the nose 33 of the platform 32, is lowered by actuator-controlled movement of the rockers and connected elastic cords into the states set out below

| Actuator number | Rocker position relative to neutral state | Actuator support spring length relative to neutral state |
|---|---|---|
| 1 | Clockwise | Contracted |
| 2 | Clockwise | Extended |
| 3 | Anticlockwise | Extended |
| 4 | Clockwise | Extended |
| 5 | Anticlockwise | Extended |
| 6 | Anticlockwise | Contracted |

Yaw about the z-Axis Configuration

In the configuration shown in FIG. 7A-D, the platform 32 rotates about a vertical axis by actuator-controlled movement of the rockers and connected elastic cords into the states set out below.

| Actuator number | Rocker position relative to neutral state | Actuator support spring length relative to neutral state |
|---|---|---|
| 1 | Clockwise | Contracted |
| 2 | Clockwise | Extended |
| 3 | Clockwise | Contracted |
| 4 | Clockwise | Extended |
| 5 | Clockwise | Contracted |
| 6 | Clockwise | Extended |

In the above description, a number of configurations for the motion generator are described. It will be appreciated that these two or more of these configurations can be combined in many different ways to simulate different motion events.

Combined Surge, Sway and Yaw

In the configuration shown in FIG. 8A-D, the motion generator is in a Combined Surge, Sway and Yaw configuration.

| Actuator number | Rocker position relative to neutral state | Actuator support spring length relative to neutral state |
|---|---|---|
| 1 | Clockwise | Contracted |
| 2 | Clockwise | Extended |
| 3 | Clockwise | Contracted |
| 4 | Clockwise | Extended |
| 5 | Clockwise | Contracted |
| 6 | Clockwise | Extended |

Combined Pitch and Roll

Figure 9:
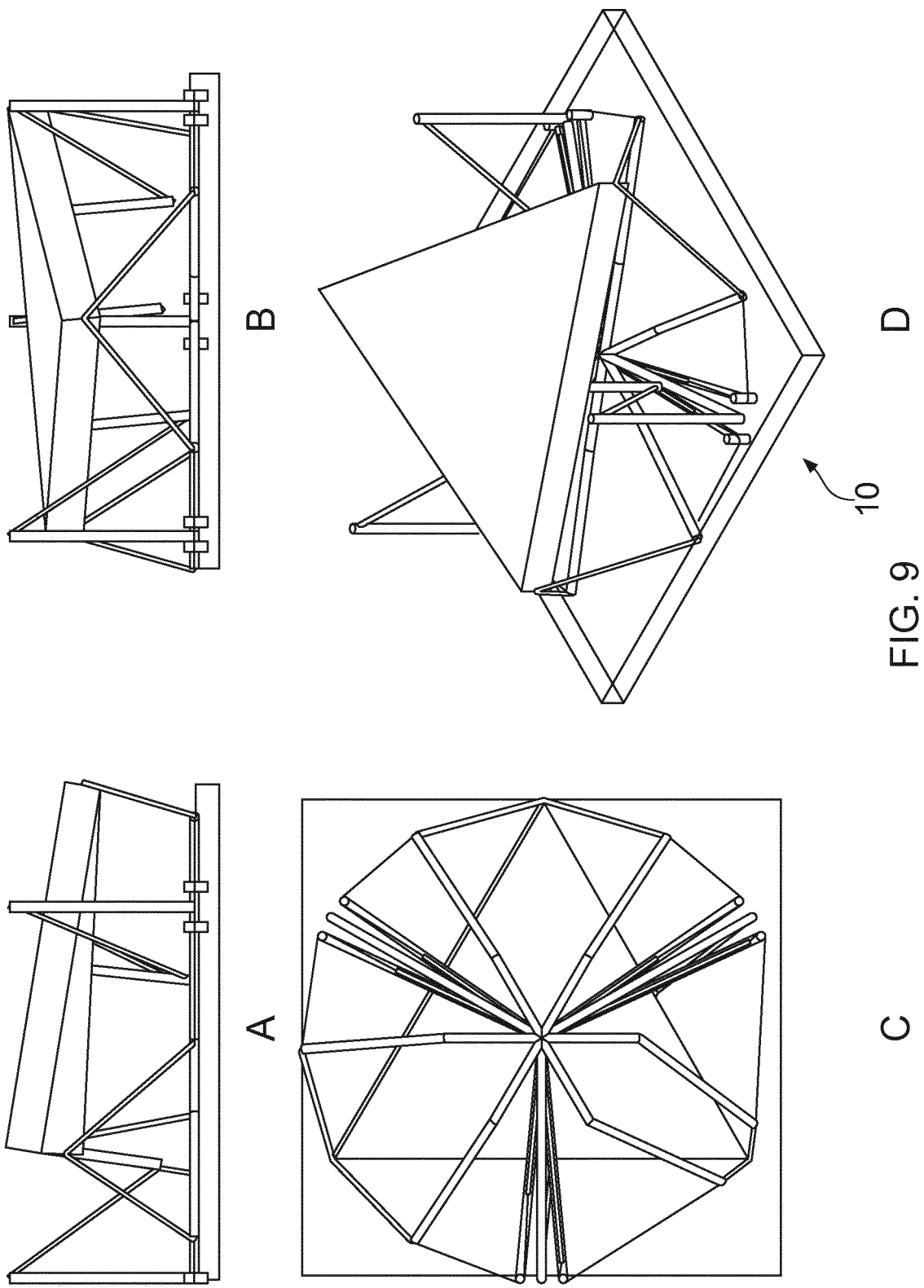
FIG. 9A is an elevation from one side of the motion generator of FIG. 1 when in a combined pitch and roll configuration.
FIG. 9B is an elevation from the front of the motion generator as shown in FIG. 9A.
FIG. 9C is a simplified plan view from below of the motion generator as shown in FIG. 9A.
FIG. 9D is a schematic perspective view of a motion generator as shown in FIG. 9A.

In the configuration shown in FIG. 9, the motion generator is in a combined pitch and roll. Configuration.

| Actuator number | Rocker position relative to neutral state | Actuator support spring length relative to neutral state |
|---|---|---|
| 1 | Clockwise | Contracted |
| 2 | Clockwise | Extended |
| 3 | Anticlockwise | Extended |
| 4 | Unchanged | Unchanged |
| 5 | Unchanged | Unchanged |
| 6 | Anticlockwise | Contracted |

Test Data

When a motion generator in accordance with the invention was tested it was found to be capable of creating movements in all six degrees of freedom with a bandwidth in excess of 50 Hz'.

The motion generator can accelerate at more than 10 m/s$^2$ in each translational direction and at more than 1000°/s$^2$ in each rotational direction. As the system is essentially a direct drive system, lacking gearboxes or ballscrews it is capable of being backdriven.

Specific practical applications of the motion generator described above are now disclosed below.

A Vehicle Simulator

Figure 10:
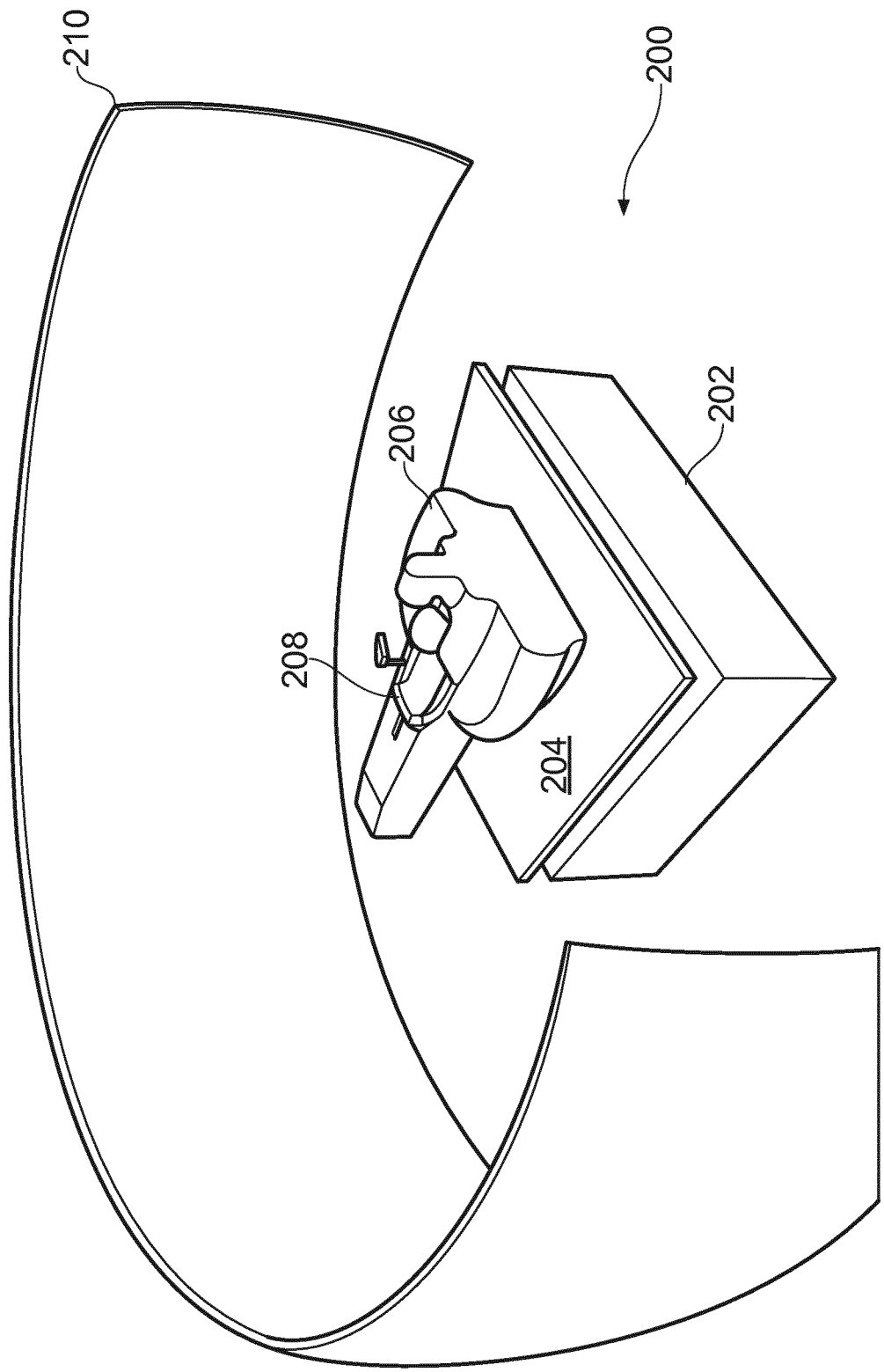
FIG. 10 is an elevation of a vehicle motion simulator incorporating a motion generator of FIG. 1 in use with a human user.

A vehicle simulator 200 is shown in FIG. 10. The vehicle simulator comprises a motion generator 202 in which the platform (end effector) 204 supports a chassis replica including a cockpit 206. Foot controls (not shown) and steering wheel 208 are mounted within the cockpit 206. A user 112 sits in cockpit 206. A projection system including screen 210 is provided which displays a driving environment simulation to a user. In use, the user feels vibrations transmitted through the mo generator 202 to the cockpit 206. A feature of the motion generator of the present invention is that when the user moves in relation to the platform 204, for example lurching sideways against a rolling movement of the platform, the motion generator is backdriven.

Vehicle Design

In a method of designing a vehicle, using a motion generator in accordance with the invention in a vehicle simulator as described above, a change in a vehicle parameter may be simulated through operation of the motion generator in a particular manner to reflect the change, and feedback from an experienced user in the simulator, and measurements on the system are useful in determining whether the change results in an improvement in vehicle performance in some aspect.

An Arcade Game Apparatus

An arcade game apparatus, for example a racing car game apparatus, may have the same main features as the vehicle simulator 200, but might, for example use a lower cost virtual reality headset system to the projection system shown in FIG. 10. Furthermore, an arcade game apparatus might include apparatus for coin, token, electronic payment system or card-controlled operation.

A further application of the system could as an arcade apparatus in which the user's body movement are detected and acted upon by the system. For example, the use may be standing on a board (e.g. surfboard or skateboard) which is fixed to the table/end effector. By shifting their weight around and applying inertial forces to the board, the user may shove or tilt the board in different directions. These movements can be used as inputs to the simulation or game. The game may also still generate movements and forces that push the board and the user in different directions.

This is possible due to the "backdrivability" of the system, meaning that its state can easily be affected by movements or loads applied to the end effector. This is possibly due to the very low friction present in the actuators compared to a typical hexapod system which might use a ball-screw actuator.

It will be appreciated that arcade game apparatus could be adapted for domestic use.

While a number of embodiments have been disclosed by way of example in this specification, it should be understood that other variations are possible within the scope of the present invention. For example, in certain applications, some or all of the rockers may move in a non-horizontal plane. Such variations are not to be regarded as a departure from the present disclosure, and all such modifications as would be obvious to one skilled in the art are intended to be included within the scope of the following claims.

The invention claimed is:

1. A motion generator (10) comprising:
   a moveable end effector (32);
   a frame (14);
   a first set of elastic elements (60, 62, 64) interconnecting the end effector (32) and the frame (14);
   a set of tensile members (92, 94, 96, 98, 100, and 102), in which the end effector is supported within the frame by the elastic elements (60, 62, 64);
   a set of actuators (80, 82, 84, 86, 88, 90); and
   at least six rockers (36, 38, 40, 42, 44, 45) each being pivotally mounted at one end thereof on the frame, and each having a free end, wherein:
      the set of tensile members (92, 94, 96, 98, 100, 102) comprises:
         at least six elongate tensile members, each elongate tensile member having one end connected to a rocker and the other end connected to one of a second set of elastic elements (104, 106, 108, 110, 112, and 114), the second set of elastic elements (104, 106, 108, 110, 112, 114) being fixed to one of the frame (14) or a base (12); and
      a set of connecting elements (46, 48, 50, 52, 54, 55) connecting each rocker to the end effector (32),
      each one of the set of tensile members (92, 94, 96, 98, 100, 102) is independently adjustably tensioned by an associated actuator (80, 82, 84, 86, 88, 90) to move the free end of the rocker, which rocker movement causes movement of a connected connecting element (46, 48, 50, 52, 54, 55) leading to movement of the end effector (32).

2. The motion generator according to claim 1, wherein the actuators comprise rotary electric motors.

3. The motion generator according to claim 1, wherein the actuators (80, 82, 84, 86, 88, 90) are mounted on the frame (14).

4. The motion generator according to claim 1, wherein the rockers (36, 38, 40, 42, 44, 45) are arranged for movement in a plane parallel with the end effector (32) when in a neutral condition or configuration.

5. The motion generator according to claim 1, wherein at least one of the rockers (36, 38, 40, 42, 44, 45) moves in a horizontal plane.

6. The motion generator according to claim 1, wherein the tensile members include an actuator-engaging surface.

7. The motion generator according to claim 1, wherein the actuator-engaging surface is provided by a toothed belt.

8. The motion generator according to claim 1, wherein the actuators are independently controlled to vary the position of the rockers independently.

9. The motion generator according to claim 8, wherein the actuators are controlled by programmable computing means.

10. The motion generator according to claim 1, wherein the connecting elements (46, 48, 50, 52, 54, 55) are resilient members.

11. The motion generator according to claim 1, wherein the motion generator is back drivable.

12. A motion system comprising:
    the motion generator according to claim 1; and
    an associated control system.

13. A combination comprising:
    the motion generator according to claim 1, and
    another motion generator.

14. A vehicle simulator (200) comprising:
    the motion generator according to claim 1;
    an associated control system; and
    at least one vehicle simulator element.

15. The vehicle simulator according to claim 14, wherein the vehicle simulator element is selected from a cockpit (206), driving cabin, foot control, steering wheel (208), or means for simulating an environment (210).

16. A method of vehicle or vehicle component design, the method comprising the steps of:

first providing one of: the motion generator according to claim 1, a motion system comprising the motion generator according to claim 1 and an associated control system, a combination comprising the motion generator according to claim 1 and another motion generator, or a vehicle simulator (200) comprising the motion generator according to claim 1 and at least one vehicle simulator element; and then simulating a vehicle or component design feature or change and testing the effect of that feature using at least one of the motion generator, the motion system, the combination, or the vehicle simulator.

17. A game apparatus for domestic or commercial use, the game apparatus comprising either:
the motion generator according to claim 1, or
a motion system comprising the motion generator according to claim 1 and an associated control system.

18. The game apparatus according to claim 17, further comprising means for simulating an environment (210).

19. The game apparatus according to claim 17, wherein the means for simulating an environment comprises at least one of a display apparatus, a virtual reality apparatus, or a projection apparatus.

20. A method of producing a motion generator, the method comprising the steps of:

assembling a motion generator (10) comprising: a moveable end effector (32), a frame (14), a first set of elastic elements (60, 62, 64) interconnecting the end effector (32) and the frame (14); a set of tensile members (92, 94, 96, 98, 100, and 102); in which the end effector is supported within the frame by the elastic elements (60, 62, 64); and a set of actuators (80, 82, 84, 86, 88, 90); at least six rockers (36, 38, 40, 42, 44, 45) each rocker being pivotally mounted at one end thereof on the frame, and each rocker having a free end; the set of tensile members (92, 94, 96, 98, 100, 102) comprising: at least six elongate tensile members, each elongate tensile member having one end connected to a rocker and the other end connected to one of a second set of elastic elements (104, 106, 108, 1 10, 1 12, and 1 14) which are fixed to one of the frame (14) or a base (12); a set of connecting elements (46, 48, 50, 52, 54, 55) connecting each rocker to the end effector (32); and independently adjusting tension in each one of the set of tensile members (92, 94, 96, 98, 100, 102) by an associated actuator (80, 82, 84, 86, 88, 90) configured to move the free end of the rocker, which rocker movement causes movement of a connected connecting element (46, 48, 50, 52, 54, 55), leading to movement of the end effector (32).

\* \* \* \* \*